United States Patent
Engel et al.

(10) Patent No.: US 7,174,523 B2
(45) Date of Patent: Feb. 6, 2007

(54) VARIABLE SIGMA ADJUST METHODOLOGY FOR STATIC TIMING

(75) Inventors: James J. Engel, Cambridge, VT (US); Jerry D. Hayes, Milton, VT (US)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 10/710,734

(22) Filed: Jul. 30, 2004

(65) Prior Publication Data
US 2006/0026544 A1 Feb. 2, 2006

(51) Int. Cl.
*G06F 17/50* (2006.01)
(52) U.S. Cl. .................... 716/6; 716/4; 716/5
(58) Field of Classification Search .......... 716/4–6
See application file for complete search history.

(56) References Cited

U.S. PATENT DOCUMENTS

| | | | | |
|---|---|---|---|---|
| 4,924,430 A | * | 5/1990 | Zasio et al. ............... | 716/6 |
| 5,636,372 A | * | 6/1997 | Hathaway et al. ......... | 713/500 |
| 6,651,230 B2 | * | 11/2003 | Cohn et al. .............. | 716/6 |
| 6,795,951 B2 | * | 9/2004 | Hathaway et al. ......... | 716/5 |
| 6,897,674 B2 | * | 5/2005 | Braceras et al. .......... | 324/765 |
| 7,069,525 B2 | * | 6/2006 | Bhushan et al. ........... | 716/4 |
| 7,080,341 B2 | * | 7/2006 | Eisenstadt et al. ........ | 716/13 |
| 2005/0066297 A1 | * | 3/2005 | Kalafala et al. .......... | 716/6 |
| 2005/0201188 A1 | * | 9/2005 | Donze et al. ............ | 365/232 |

* cited by examiner

*Primary Examiner*—Vuthe Siek
*Assistant Examiner*—Naum B. Levin
(74) *Attorney, Agent, or Firm*—Gibb I.P. LawFirm, LLC; Richard M. Kotulak, Esq.

(57) ABSTRACT

The invention presents a method of accommodating for across chip line variation (ACLV) and/or changing static timing of an integrated circuit design. The invention first establishes a circuit design having initial timing requirements and an initial voltage supply and also establishes a relationship between gate timing variations caused by voltage supply changes and gate timing variations caused by manufacturing processing changes. Then, according to the customer's orders that change the initial timing requirements to revised timing requirements, the invention changes the initial voltage supply to a revised voltage supply to accommodate the revised timing requirements (and ACLV if desired) based on the relationship between voltage limits and transistor delay. This process of changing the initial voltage supply does not alter the circuit design.

7 Claims, 5 Drawing Sheets

VARIABLE SIGMA ADJUST METHODOLOGY FOR STATIC TIMING

BACKGROUND OF INVENTION

1. Field of the Invention

The invention presents a method of varying the timing of an integrated circuit design by adjusting the voltage supplies to accommodate revised timing requirements.

2. Description of the Related Art

To remain competitive in today's ASIC environment, design centers are becoming increasingly sensitive to Turn Around Time (TAT) that measures the time it takes to go from design concept to production hardware. A decrease in TAT correlates to an increase in design center through-put which typically translates directly to higher revenues. In addition to higher revenues, a reduction in TAT also leads to increased customer satisfaction and business opportunities. Studies have shown that difficulties in static timing closure is often a major contributor to excessive TAT.

These difficulties are often the result of using timing models that reflect only the extreme process corners or variations in the manufacturing line. Process extremes are defined by both front end process variations that affect gate delay and back end process variations that affect wire delay. For timing closure, all timing requirements for the design must today be met at both the slow and fast process extremes represented by the timing models. The farther apart these process extremes become, the more difficult and resource consuming it is to meet static timing requirements.

The ability to accurately reduce these process extremes from a timing model's perspective would greatly facilitate many situations that do not require timing closure at the process extremes. One example of this is timing closure for prototype hardware. In this situation, product yield would be sacrificed for the ability to get prototype hardware to the customer much sooner than would be possible if doing timing closure at the process extremes. Another example is customers that are willing to pay a premium to offset product yield loss on production hardware in order to reduce TAT or design for higher performance hardware. A third example is when the manufacturing line deliberately shifts or changes the process extremes as the result of line tailoring.

Each of these examples would require the timing models to adjust to new process corners, however today that translates to a complete re-characterization of the models, a task that would take months and many resources. This disclosure proposes a new methodology that allows existing fixed process timing models to dynamically adjust to user specified process extremes for both front end and back end variations without the need to re-characterize the models.

SUMMARY OF INVENTION

The invention presents a method for changing static timing of an integrated circuit design. The invention first establishes a circuit design having initial timing requirements and an initial voltage supply and also establishes a relationship between gate timing variations caused by voltage supply changes and gate timing variations caused by manufacturing processing changes. Then, according to the customer's orders that change the initial timing requirements to revised timing requirements, the invention changes the initial voltage supply to a revised voltage supply to accommodate the revised timing requirements (and ACLV if desired) based on the relationship between gate timing variations caused by voltage supply changes and gate timing variations caused by manufacturing processing changes. This process of changing the initial voltage supply does not alter the circuit design.

Stated differently, the invention establishes initial voltage sensitivity curves relating to the relationship between gate timing variations caused by voltage supply changes and gate timing variations caused by manufacturing processing changes in a circuit design for slow and fast process extremes. The invention also establishes an initial voltage supply at which initial process corners appear on the voltage sensitivity curves and establishes revised process corners for which initial timing requirements are to be changed into revised timing requirements. Next, the invention establishes revised voltage sensitivity curves relating to the revised process corners and changes the initial voltage supply to a revised voltage supply to accommodate the revised timing requirements based on where the revised process corners cross the revised voltage sensitivity curves.

The initial timing requirements and the revised timing requirements comprise one of two extreme process corners for the circuit design consisting of either the fastest process timing allowed by the circuit design or the slowest process timing allowed by the circuit design. The revised timing requirements are used to determine whether manufactured chips are defective. The invention is useful with circuit designs that are made up of a common transistor design.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

The invention will be better understood from the following detailed description with reference to the drawings, in which.

DETAILED DESCRIPTION

Figure 1:
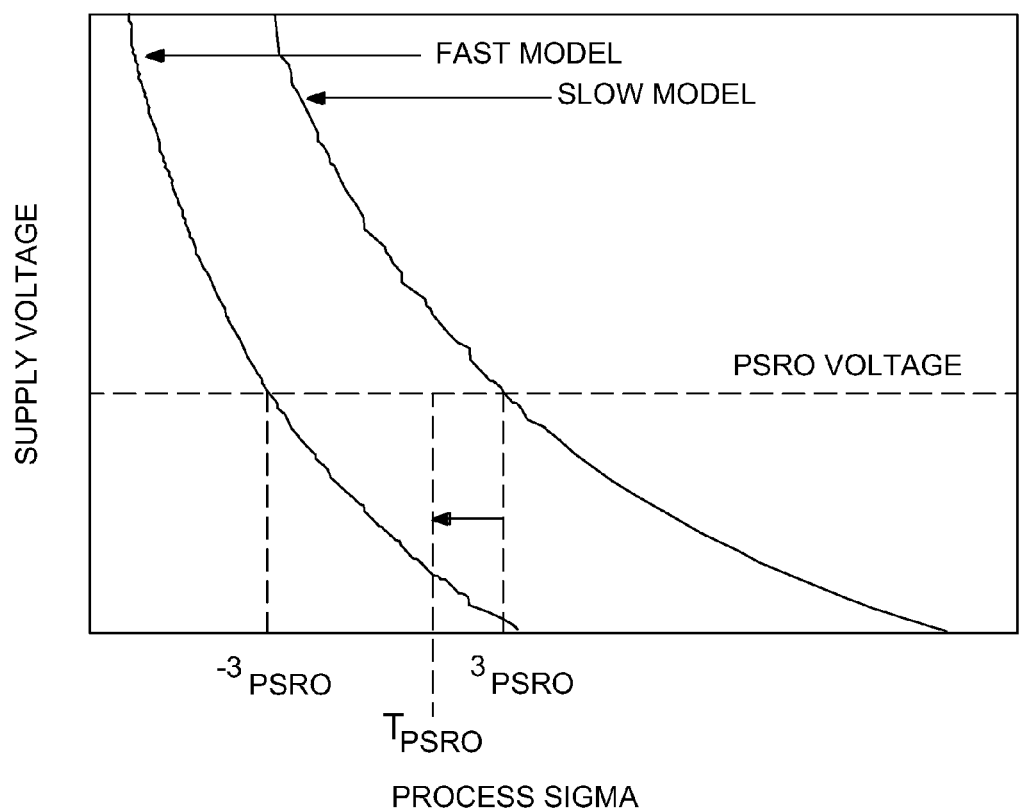
FIG. 1 is a graph illustrating the voltage sensitivity of both the fast and slow timing models representing the extreme process corners of the manufacturing line.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The inventive methodology leverages the voltage sensitivity of a technology FET (field effect transistor) model that affects gate delay. For gates designed with a common FET type, a relationship between voltage sensitivity to timing and process sensitivity to timing can be established for a given design. Using this relationship, a shift in a process corner can be accounted for when using fixed process timing models simply by an appropriate adjustment of the supply voltage (a "process corner," as used herein, is some measurable parameter, such as size, yield, speed, voltage, etc.). Since supply voltage only affects gate delay and not wire delay, the invention uses voltage sensitivity of the FET model to differentiate what percentage of an overall path is gate and what percentage is wire. This allows the invention to separate front end process variations from back end process variations in timing models made up of both gate and wire delay. In addition to all the advantages of being able to adjust fixed process timing models to new process corners without the need to regenerate the timing models, several other benefits can also be realized from this new inventive methodology, such as accounting for ACLV.

To account for across chip line variations (ACLV) or over chip variation (OCV) that can cause variations in path performance across the chip, the current methodology for bounding these variations in static timing uses linear combination delay (LCD). LCD adds a percentage of the fast model's performance with a percentage of slow model's performance in order to speed up or slow down a path by the same amount that the path could change in hardware due to ACLV. The disadvantage of using LCD in static timing is that it requires calculation with both the fast and slow models at each process corner. With the new methodology, ACLV is account for by simply an adjustment in supply voltage using only the timing model corresponding to the process corner under analysis which reduces the simulation time of static timing by two times. In addition to a reduction in simulation time, the appropriate amount of ACLV can now be separately applied to gate and wire delay. This tends to reduce the conservatism that results when front end ACLV is applied to back end wire delay, thus making it easier to close timing.

FIG. 1 illustrates the voltage sensitivity of both the fast and slow timing models representing the extreme process corners of the manufacturing line. The models in FIG. 1 have no wire delay component. In other words they are made up of only gate delay and are therefore sensitive only to front end process variations. The x-axis of the graph represents relative delay performance, with faster delay towards the left and slower delay towards the right.

The technique used for determining whether hardware is shipped to the customer (whether it is defective or not) is to use process screening ring oscillators (PSRO) on each chip. PSROs are a measure of the speed or performance of the hardware, and if it falls between the performance predicted by the fast and slow timing models that were used for timing closure, the hardware is shipped to the customer, otherwise it is rejected. The screening is done at a predefined voltage referred to as the PSRO voltage in FIG. 1 that is independent of the customer's actual supply voltage. The intersection of the PSRO voltage line and the fast and slow model curves define the process corners for the technology. The fast process corner is denoted as—3 psro above while the slow process corner is denoted as 3 psro. The "3" is in reference to a sigma of a guassian distribution representing the manufacturing line. All hardware between −3 psro and 3 psro is shipped. To illustrate the methodology of this disclosure, an example of a customer wanting to move the 3 psro process corner to a less restrictive target process corner (Tpsro) in order to improve TAT will be used.

Shifting the slow process corner from 3 psro to Tpsro can be expressed in terms of a factional change relative to the range between −3 prso and 3 psro as, $$\text{Delta}=(3\ \text{psro}-T\text{psro})/(3\ \text{psro}-(-3\ \text{psro})) \quad \text{Equation 1}$$

Figure 2:
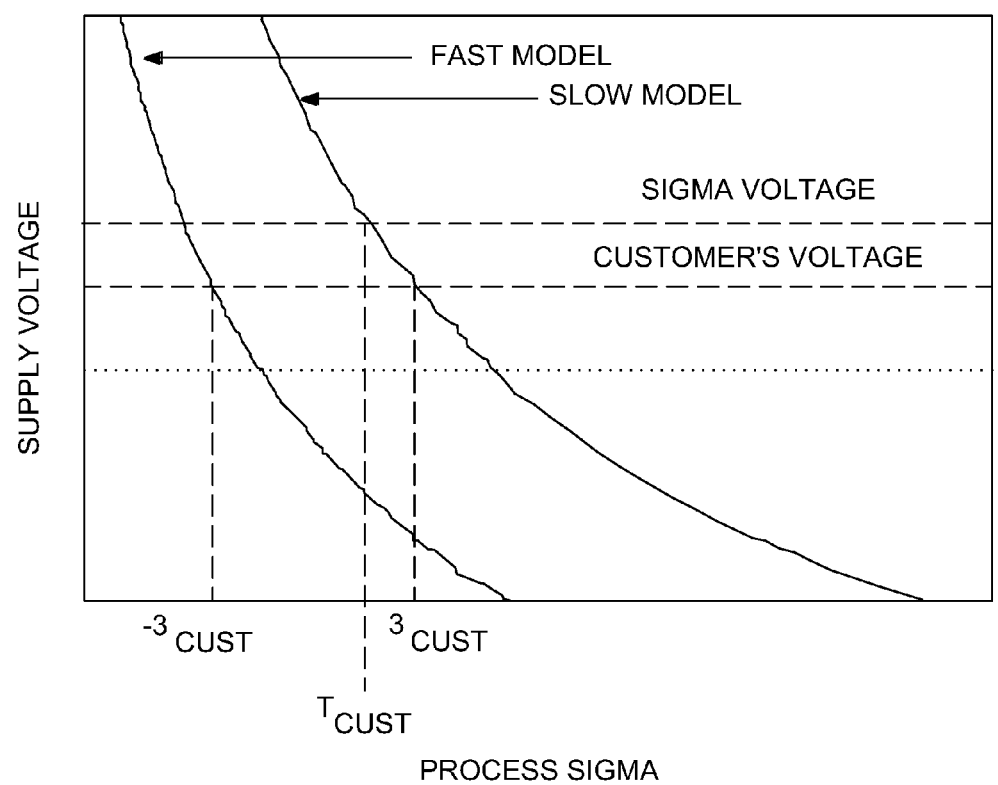
FIG. 2 is a graph illustrating the methodology for extending Delta to the customer's timing environment.

With Delta representing the shift of the slow process corner as a factional change, this shift can now be represented at any supply voltage, and in particular at the customer's supply voltage for slow timing analysis. FIG. 2 illustrates the methodology for extending Delta to the customer's timing environment. The customer's supply voltage is denoted as "Customer's voltage." The horizontal line associated with the customer's voltage also intersects the fast and slow model curves, however the increase in supply voltage when going from "PSRO voltage" to "Customer's voltage" caused shifts in performance at both process corners denoted as −3 cust and 3 cust. It is important to note that this shift was caused by a change in voltage, not a change in process.

FIG. 2 illustrates the use of a sigma voltage offset to mimic process corner variations.

Therefore, −3 cust and 3 cust represents the same process corners as defined by −3 psro and 3 psro in FIG. 1. Since the customer expressed a shift in the slow process corner (Tpsro) in reference to −3 psro and 3 psro, the invention needs to calculate an equivalent Tcust relative to −3 cust and 3 cust. The equation to calculate Tcust is given as, $$T\text{cust}=3\ \text{cust}-\text{Delta}*(3\ \text{cust}-(-3\ \text{cust})) \quad \text{Equation 2}$$

Delta was obtained from equation 1. Note that the line for Tcust intersects the horizontal line associated with the customer's voltage and also the voltage sensitivity curve of the slow model. In order to close timing at Tcust, one could use new slow models that are generated specifically for Tcust or one could use the existing slow models at an elevated voltage denoted as "SIMGA voltage" in FIG. 2 that mimics the new process corner.

Adjusting the supply voltage is a quick and easy way for the invention to adjust process corners that describes the range of variability in the manufacturing line from chip to chip, wafer to wafer, and lot to lot. However, this technique can be applied to across chip line variation (ACLV). It is important to account for ACLV because of its effect on early and late arrival times of a given path. ALCV can be expressed in terms of delta PSRO values across the chip using a technique similar to equation 1. With delta PSRO expressed as a fraction of the total range as defined by −3 psro and 3 psro, a Taclv value relative to Tcust can be calculated as, $$T\text{aclv}=T\text{cust}-\text{Delta PSRO}*(T\text{cust}-(-3\ \text{cust})) \quad \text{Equation 3}$$

Figure 3:
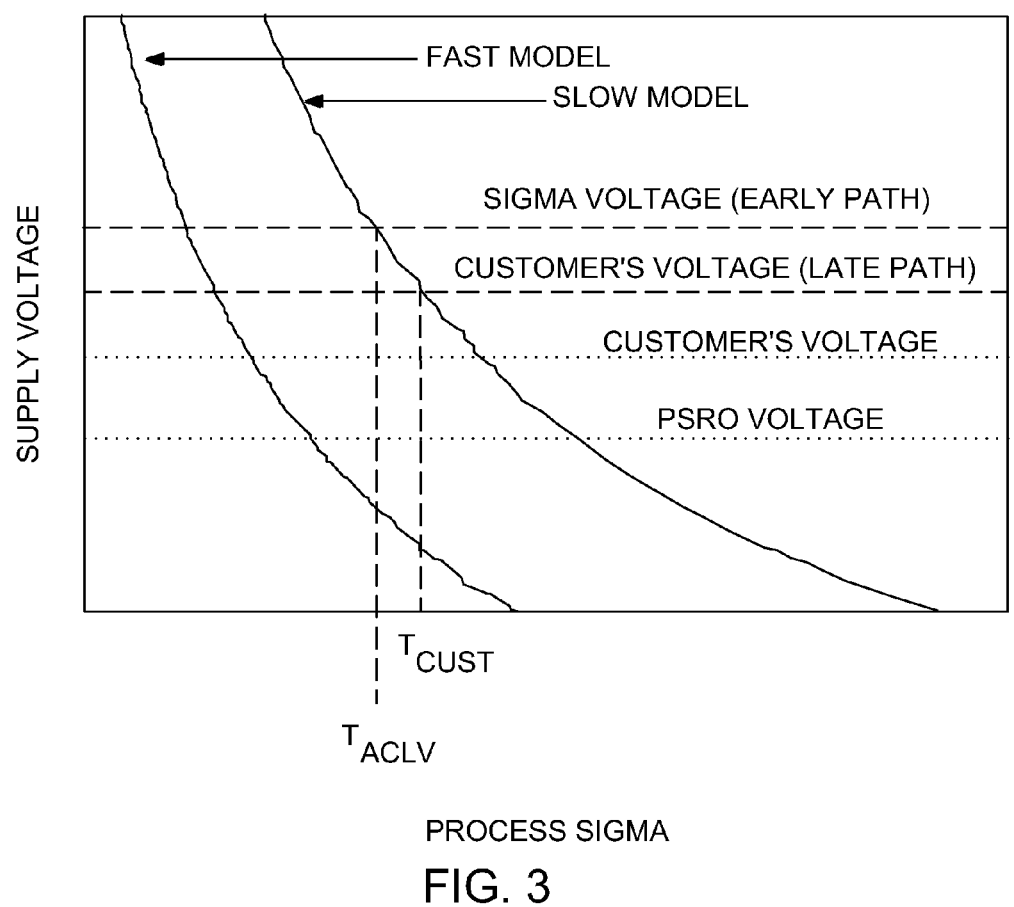
FIG. 3 is a graph illustrating using voltage to bind the effects of ACLV.

FIG. 3 illustrates the methodology of using voltage to bind the effects of ACLV. The supply voltage corresponding to Taclv is denoted as "SIMGA voltage (Early Path)" and is used in estimating early path delay while the supply voltage corresponding to Tcust referenced as "SIMGA voltage (Late Path)" is used for late path timing. Note that both early and late path timing uses the same slow model, the only difference is the voltage that is used. This technique simulates two times faster than the LCD methodology that requires both early and late paths to be simulated using both fast and slow timing models.

Figure 4:
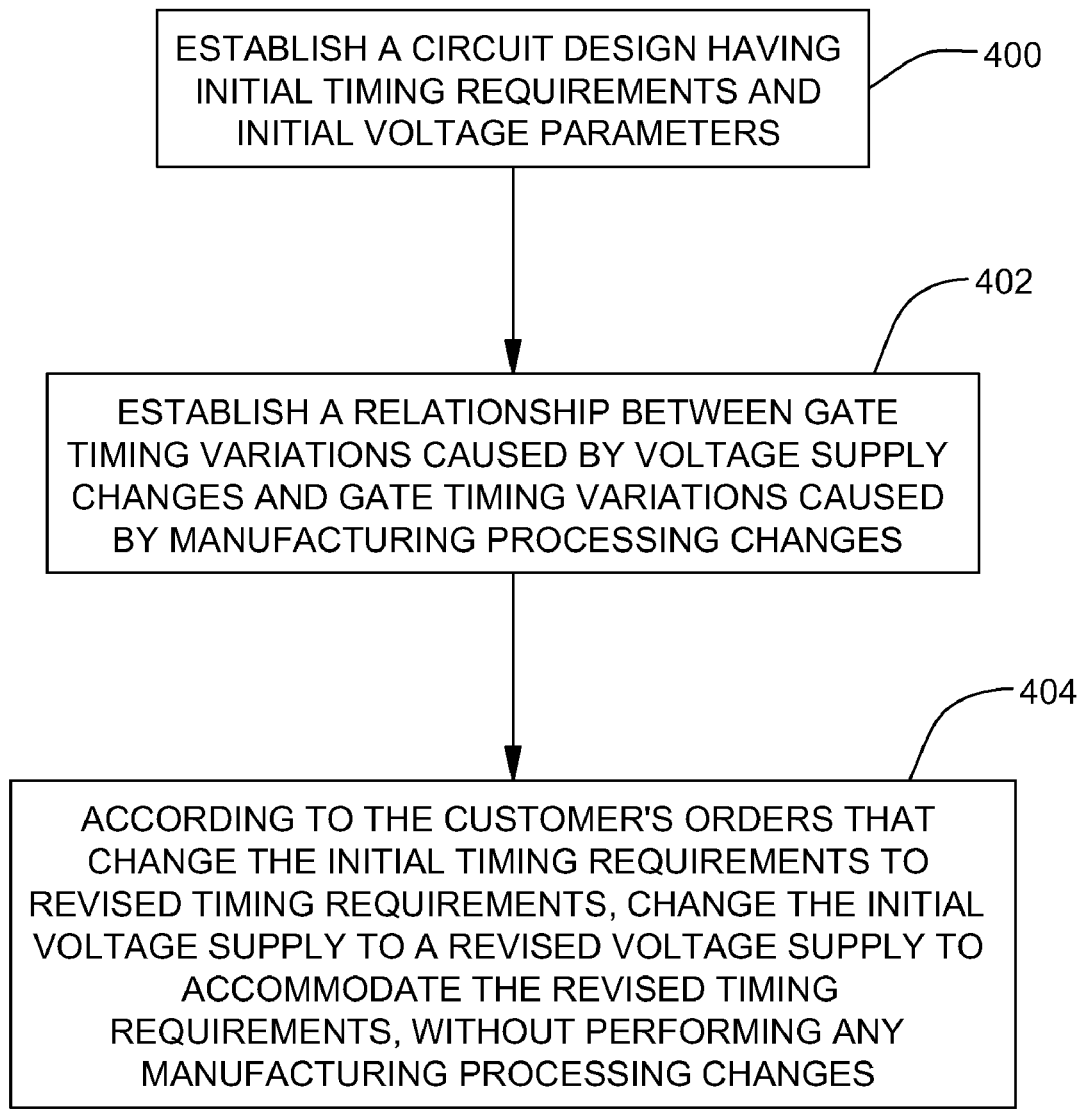
FIG. 4 is a flow diagram illustrating one aspect of the invention.

FIG. 4 illustrates the inventive method of accommodating for across chip line variation (ACLV) and/or performing static timing analysis of an integrated circuit design in flowchart format. More specifically, as shown in FIG. 4, the invention first establishes a circuit design having initial timing requirements and an initial voltage supply 400 and also establishes a relationship between gate timing variations caused by voltage supply changes and gate timing variations caused by manufacturing processing changes 402. Then, according to the customer's orders that change the initial timing requirements to revised timing requirements, the invention changes the initial voltage supply to a revised voltage supply 404 to accommodate the revised timing requirements, without performing any manufacturing processing changes. The process of changing the initial voltage supply 404 changes the initial voltage supply sufficiently to compensate for across chip line variation (ACLV) differently in different areas of the chip depending upon whether the area is involved with early or late path timing. This process of changing the initial voltage supply 404 does not alter the circuit design.

The initial timing requirements and the revised timing requirements comprise one of two extreme process corners for the circuit design consisting of either the fastest process timing allowed by the circuit design or the slowest process timing allowed by the circuit design. The revised timing requirements are used to determine whether manufactured chips are defective. The invention is useful with circuit designs that are made up of a single, common transistor design.

Figure 5:
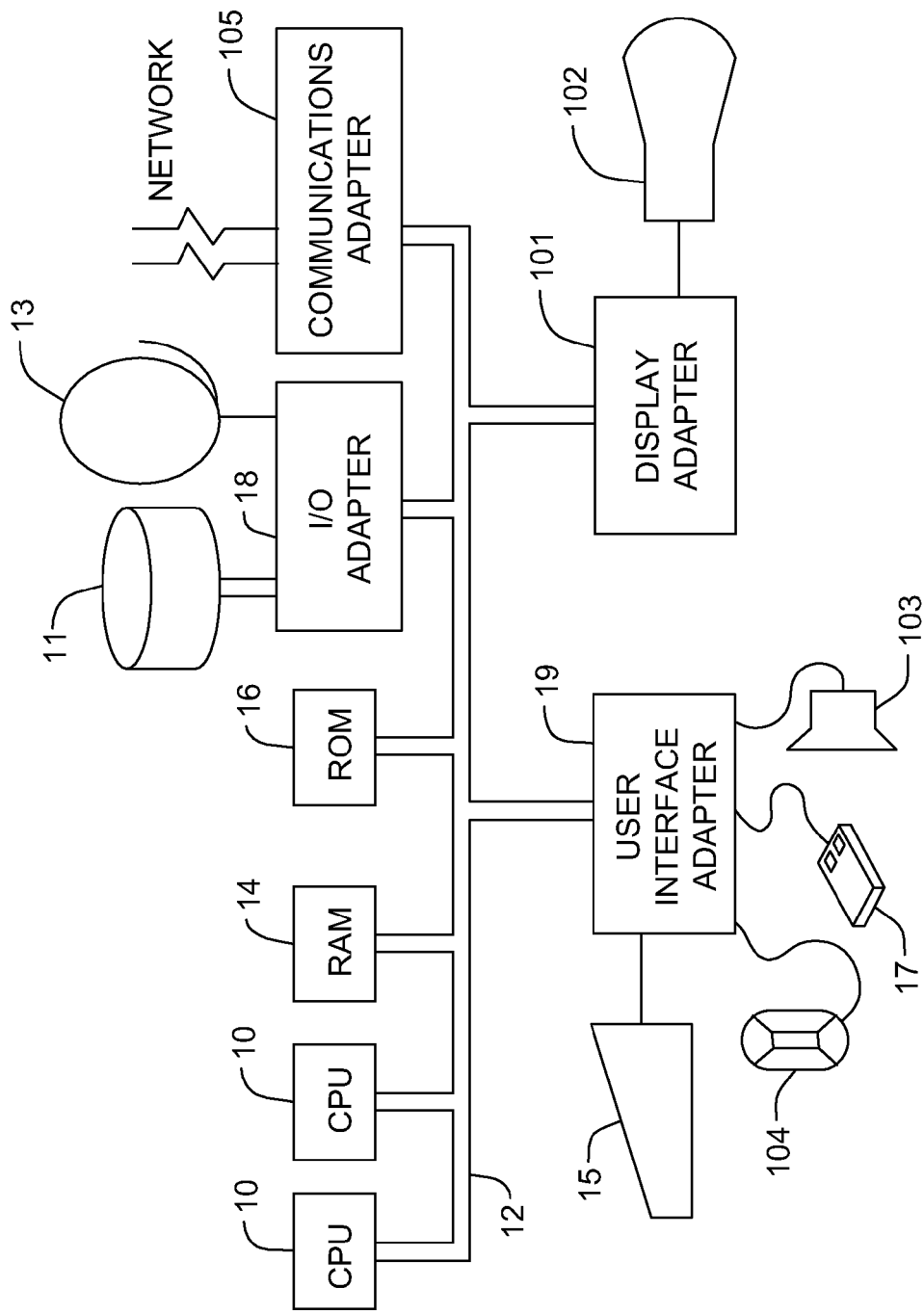
FIG. 5 is a schematic hardware diagram upon which the invention could operate.

FIG. 5 is a representative hardware environment for practicing the present invention, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

Thus, as shown above, the inventive methodology leverages the voltage sensitivity of a technology FET (field effect transistor) model that affects gate delay. For gates designed with a common FET type, a relationship between voltage sensitivity to timing and process sensitivity to timing can be established. Using this relationship, a shift in a process corner can be accounted for when using fixed process timing models simply by an appropriate adjustment of the supply voltage. In addition to all the advantages of being able to adjust fixed process timing models to new process corners without the need to regenerate the timing models, several other benefits can also be realized from this new inventive methodology, such as compensating for ACLV.

While the invention has been described in terms of preferred embodiments, those skilled in the art will recognize that the invention can be practiced with modification within the spirit and scope of the appended claims.

The invention claimed is:

1. A method of adjusting process corners for adjusting timing of an integrated circuit design, said method comprising:
   establishing initial voltage sensitivity curves relating to the relationship between gate timing variations caused by voltage supply changes and gate timing variations caused by manufacturing processing changes in a circuit design for slow and fast process extremes;
   establishing an initial voltage supply at which initial process corners appear on said voltage sensitivity curves;
   establishing revised process corners for which initial timing requirements are to be changed into revised timing requirements;
   establishing revised voltage sensitivity curves relating to said revised process corners; and
   changing said initial voltage supply to a revised voltage supply to accommodate said revised timing requirements based on where said revised process corners cross said revised voltage sensitivity curves.

2. The method in claim 1, wherein said process of changing said initial voltage supply does not perform any of said manufacturing processing changes.

3. The method in claim 1, wherein transistors in said circuit design are based on a common transistor design.

4. The method in claim 1, wherein said revised timing requirements are used to determine whether manufactured chips are defective.

5. The method in claim 1, wherein said initial timing requirements and said revised timing requirements comprise one of two extreme process corners for said circuit design consisting of either the fastest process timing allowed by said circuit design or the slowest process timing allowed by said circuit design.

6. The method in claim 1, wherein said process of changing said initial voltage supply includes changing said initial voltage supply sufficiently to compensate for across chip line variation (ACLV).

7. The method in claim 1, wherein said revised timing requirements comprise front end process timing requirements associated with said gate delay.

* * * * *